(12) United States Patent
Budhwani

(10) Patent No.: US 12,518,880 B1
(45) Date of Patent: Jan. 6, 2026

(54) POST-MORTEM MULTIMODAL TUMOR SUPERMODEL

(71) Applicant: Karim I. Budhwani, Birmingham, AL (US)

(72) Inventor: Karim I. Budhwani, Birmingham, AL (US)

(*) Notice: Subject to any disclaimer, the term of this patent is extended or adjusted under 35 U.S.C. 154(b) by 355 days.

(21) Appl. No.: 17/687,150

(22) Filed: Mar. 4, 2022

Related U.S. Application Data

(60) Provisional application No. 63/292,065, filed on Dec. 21, 2021.

(51) Int. Cl.
| | | |
|---|---|---|
| *G16H 20/10* | (2018.01) | |
| *G01N 33/574* | (2006.01) | |
| *G16B 35/00* | (2019.01) | |
| *G16H 50/50* | (2018.01) | |

(52) U.S. Cl.
CPC ....... *G16H 50/50* (2018.01); *G01N 33/57484* (2013.01); *G16B 35/00* (2019.02)

(58) Field of Classification Search
None
See application file for complete search history.

(56) References Cited

U.S. PATENT DOCUMENTS

| | | | | |
|---|---|---|---|---|
| 4,810,781 A * | 3/1989 | Hollinshead | ........... | C07K 16/30 530/808 |
| 6,623,733 B1 * | 9/2003 | Hossainy | ........... | A61K 38/4886 424/572 |
| 2002/0064804 A1 * | 5/2002 | Marnett | ............... | G01N 33/573 435/25 |
| 2002/0090725 A1 * | 7/2002 | Simpson | ............. | D01D 5/0038 623/23.72 |
| 2006/0014157 A1 * | 1/2006 | Kawabe | .................. | A61P 35/00 435/6.14 |
| 2012/0135446 A1 * | 5/2012 | Collins | .................. | C12M 23/16 435/29 |

(Continued)

OTHER PUBLICATIONS

"The Clinical, Research, and Social Value of Autopsy after Any Cancer Death: A Perspective from the Children's Oncology Group Soft Tissue Sarcoma Committee"; Spunt et al.; Cancer; Jun. 15, 2012. (Year: 2012).*

(Continued)

*Primary Examiner* — John A Pauls
(74) *Attorney, Agent, or Firm* — C. Brandon Browning; Nicholas J. Landau; Maynard Nexsen PC

(57) ABSTRACT

The present disclosure is directed to methods of modeling effectiveness of cancer therapeutics using live tissue from post-mortem cancer patient donors. Eligible cancer patient donors are identified and registered, along with relevant donor demographics and medical history. At least one tumor tissue sample is collected from each donor a predetermined period of time after donor death, where the tissue samples include dissociated cells and tissue sections. The samples are analyzed using one or more of in vitro, in vivo, ex vivo, and in silico models, either alone or in combination, to determine the effectiveness of at least one cancer therapeutic candidate. Donor diversity and increased sample size for tissue analysis increases the ability to identify promising therapeutic candidates relative to typical clinical trials.

35 Claims, 3 Drawing Sheets

(56) References Cited

U.S. PATENT DOCUMENTS

2017/0211039 A1* 7/2017 Ohlemacher .......... C12N 5/062
2021/0123915 A1* 4/2021 Gondal ................. G01N 33/84

OTHER PUBLICATIONS

"Rapid Autopsy Programs and Research Support: The Pre-and Post-COVID-19 Environments"; Jody E. Hooper, MD; AJSP: Reviews & Reports; Mar./Apr. 2021 (Year: 2021).*
Cook et al., "Predictive in vivo animal models and translation to clinical trials", Drug Discovery Today, vol. 17, Issue 5/6, Mar. 2012. pp. 253-260.
Weiswald et al., "Spherical Cancer Models in Tumor Biology", Neoplasia, vol. 17, Issue 1, Jan. 2015, pp. 1-15.
Viqueira et al., "An In vivo Platform for Translational Drug Development in Pancreatic Cancer", Cancer Therapy: Preclinical, vol. 12, Issue 15, Aug. 1, 2006, pp. 4652-4661.
Ekins et al., "In silico pharmacology for drug discovery: methods for virtual ligand screening and profiling", British Journal of Pharmacology, vol. 152, 2007, pp. 9-20.
Cheon et al., "Mouse Models of Cancer", Annual Review of Pathology: Mechanisms of Disease, vol. 6, 2011, pp. 95-119.
Jakeman et al., "Improved In Vitro Human Tumor Models for Cancer Gene Therapy", Human Gene Therapy, vol. 26, May 2015, pp. 249-256.
Day et al., "Preclinical Mouse Cancer Models: A Maze of Opportunities and Challenges", Cell, vol. 163, Sep. 24, 2015, pp. 39-53.
Beverly A. Teicher, "Tumor models for efficacy determination", Mol Cancer Ther, vol. 5, Issue 10, Oct. 2006, pp. 2435-2443.

* cited by examiner

POST-MORTEM MULTIMODAL TUMOR SUPERMODEL

RELATED APPLICATIONS

This application claims priority to U.S. Provisional Patent Application No. 63/292,065 filed on Dec. 21, 2021, titled "Post-Mortem Multimodal Tumor Supermodel", the entire contents of which are incorporated herein.

TECHNICAL FIELD

The present invention is directed to methods of post-mortem tumor tissue analysis and modeling with a multimodal tumor supermodel.

BACKGROUND OF INVENTION

Clinical trials for candidate cancer therapeutics are designed to identify promising candidates and treatment regimens. Through clinical trials, medical professionals and researchers may determine novel ways to diagnose, treat, and prevent cancers. Further, data from clinical trials may aid in management of treatment side effects. However, while cancer therapeutic candidates may prove effective in in vitro studies and in animal models, their successes often does not translate to humans.

One shortcoming of many cancer clinical trials is that the patients eligible to participate in a trial represent only a small subset of applicable cancer patients. Trial participation may be determined based on eligibility criteria, such as age, stage of cancer, general health conditions, and previous treatments. Trial participants are generally those who have already received available FDA approved and health insurance covered therapies, or are patients in a non-curative stage of disease progression. Trial participation is also constrained by logistical parameters such as geographical proximity to applicable trial, transportation and lodging, adherence and compliance considerations stemming from various potentially unrelated factors including availability of caregivers, family and household obligations, and socioeconomic status. Trial participation among racial and ethnic minorities and in historically disadvantaged segments remains disproportionately skewed. Thus, trial participants do not represent the general population of cancer patients, are often at a later stage of cancer, and/or exhibit a greater resistance to available therapies than is typical of all cancer patients.

According to current procedures, many candidate therapeutics may fail human trials simply due to a restricted participant pool. Furthermore, therapeutics that pass clinical trials may only be responsive in a smaller segment of the population that is able to participate in trials thereby further marginalizing already disadvantaged populations. Methods and systems for analyzing cancer therapeutic candidates in a larger and more diverse human population present opportunities for discovery of more promising candidates.

SUMMARY OF THE INVENTION

The present invention is directed to a method of modeling effectiveness of cancer therapeutics using live tissue from post-mortem cancer patient donors. The method includes first identifying and registering an eligible cancer patient donor. Within a predetermined time period after recorded time of death of the eligible cancer patient donor, at least one tissue sample is collected. The at least one tissue sample is prepared and analyzed for improved understanding of disease. Analysis is undertaken using the at least one tissue sample with at least one of an in vitro model, an in silico model, an in vivo model, an ex vivo model, or a combination thereof. Further, the effectiveness of at least one cancer therapeutic candidate is analyzed using the at least one tissue sample with at least one of an in vitro model, an in silico model, an in vivo model, an ex vivo model, or a combination thereof.

In some instances, the predetermined time period is twelve hours after recorded time of death of the eligible cancer patient donor. The eligible cancer patient donor has consented to tissue donation and is a patient who is under treatment for, suspected of having, or diagnosed with cancer. The cancer is a subject of treatment with the at least one cancer therapeutic candidate. In some instances, the eligible cancer patient donor is a patient who has been or was under treatment for cancer in the 24 months leading up to recorded time of death.

In some embodiments, the method further includes storing the at least one tissue sample after collection so that the at least one tissue sample remains viable. In some embodiments, the method further includes transporting the at least one tissue sample to a secondary location after storage, so that the at least one tissue sample remains viable throughout transport, such as remaining at approximately 4° C. throughout transport.

In some embodiments, the at least one tissue sample is collected using an 18-gauge or higher spring-loaded core needle biopsy system, while in other embodiments, the collection is a resection of the at least one tissue sample. The resection of the at least one tissue sample is approximately 20 mm×10 mm×2 mm in some instances. In some instances, at least one solid tissue sample is analyzed in conjunction with at least one liquid tissue sample, at least one solid tissue sample is analyzed in conjunction with at least one other solid tissue sample, or at least one liquid tissue sample is analyzed in conjunction with at least one other liquid tissue sample. In some instances, at least one tumor tissue sample is analyzed in conjunction with at least one non-tumor tissue sample.

In some embodiments, at least one tumor tissue sample is analyzed in conjunction with an ethnic origin of the eligible cancer patient donor, a geographic profile of a residential history of the eligible cancer patient donor, or an envirome of a residential history of the eligible cancer patient donor. In some instances, at least one tumor tissue sample is analyzed in conjunction with demographics and clinical parameters of the eligible cancer patient donor, where demographics and clinical parameters include at least one of donor age, weight, comorbidities, and functional status, the demographics and clinical parameters recorded at diagnosis and through course of treatment of the eligible cancer patient donor.

In yet another aspect of the invention, there is provided a method of modeling effectiveness of cancer therapeutics using live tissue from post-mortem cancer patient donors. The method includes first identifying an eligible cancer patient donor, registering the eligible cancer patient donor, and registering donor information specific to the eligible cancer patient donor. At least one tissue sample is collected within a predetermined time period after recorded time of death of the eligible cancer patient donor, the at least one tissue sample including at least one of dissociated cells and tissue sections. The at least one tissue sample is analyzed for improved understanding of disease using the at least one tissue sample with at least one of an in vitro model, an in silico model, an in vivo model, an ex vivo model, or a combination thereof. Further, the effectiveness of at least one cancer therapeutic candidate is analyzed using the at least one tissue sample with at least one of an in vitro model, an in silico model, an in vivo model, an ex vivo model, or a combination thereof.

In some embodiments, the donor information includes at least one of donor age, weight, comorbidities, and functional status, and residential history. In some embodiments, at least one tumor tissue sample is analyzed in conjunction with the donor information. In some embodiments, the method further includes de-identifying data produced from analysis of the at least one tissue sample. In some instances, the de-identified data is entered into a library for future biopharma research and discovery, while in other instances, the de-identified data is provided to a repository to improve future in silico modeling.

In some embodiments, the method further includes the step of identifying therapeutic lead and backup candidates from the analyzing of at least one cancer therapeutic candidate. For identified therapeutic lead and backup candidates, at least one of the following is determined: associated dosing, trial design, treatment strategy, disease mechanisms and therapeutic response characteristics, progression profile, prognosis biomarkers, diagnosis and diagnostics parameters, metastatic potential, recurrence, and refractory. In some instances, the therapeutic lead and backup candidates are identified for evaluating counterfactual efficacy of promising formulations that previously failed preclinical or clinical trials. In some instances, the therapeutic lead and backup candidates are identified for counterfactual personalized efficacy assessment of FDA approved therapy for cancer diagnosis. In some instances, the therapeutic lead and backup candidates are identified for counterfactual triage and enrollment in umbrella or independent clinical trials. In some instances, the therapeutic lead and backup candidates are identified for simulating outcomes with in vivo avatars of donor tumors developed post facto.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

Figure 1:
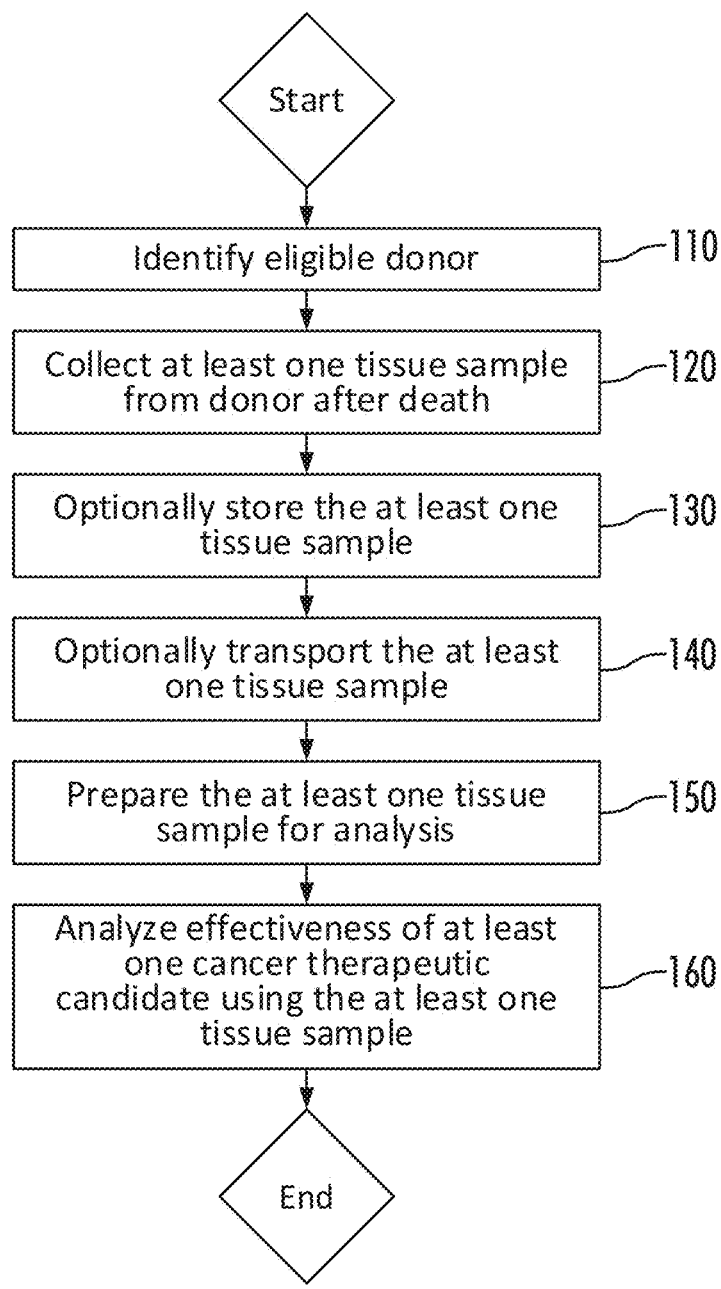
FIG. 1 is a flowchart providing a schematic view of the post-mortem tissue evaluation method of the present disclosure.

The present disclosure is directed to systems and methods of evaluating cancer therapeutic candidates using resected post-mortem tissue. Both tumor tissue and non-tumorous (control) tissue are collected from deceased organ and/or tissue donors within a predetermined time period after the recorded time of death of the donor. Collected tissue is maintained, stored, and transported in conditions designed to maintain live tissue. After transport, collected tissue is prepared for analysis using one or more model modalities. In such systems, one or more candidate cancer therapeutic is evaluated using the tissue. High-throughput evaluation is possible, allowing many potential therapeutics to be evaluated against adequate tissue volumes from a single individual and/or tissue samples across a larger number of individuals than is generally possible in current clinical trials. Therefore, a larger number of promising candidate therapeutics may be identified due to the larger sample size, diversity of donors, high-throughput format, and multimodal tumor supermodel format of the present disclosure.

The term "cancer" includes any member of the disease class that is characterized by uncontrolled growth of abnormal cells. The term encompasses all stages and grades of cancer, whether characterized or not, including malignant, benign, malignant tissue or solid, including all known cancer and neoplastic diseases, and pre- and post-exocrine cancers. Examples of various types of cancer are lung cancer (e.g., non-small cell lung cancer), gastrointestinal carcinogen tumors, colon cancer, rectal cancer, anal cancer, cholangiocarcinoma, small bowel cancer, abdominal (upper) cancer, gastrointestinal cancer, esophagus cancer, gall bladder cancer, liver cancer, pancreatic cancer, appendix cancer, breast cancer, ovarian cancer, kidney cancer (e.g., renal cell carcinoma), cancer of the central nervous system, cutaneous cancer, lymphoma, chorionic villus carcinoma, head and neck cancer, osteogenic sarcoma, and blood cancers. As used herein, "tumor" includes biological constructs with one or more cancer cells.

The term "tissue" refers to any aggregation of stem, differentiated, de-differentiated, induced pluripotent, specialized, or genetically engineered cells which are united in the performance of a particular function.

As used herein, the term "therapeutic" means an agent utilized to treat, combat, ameliorate, prevent or improve an unwanted condition or disease of a patient.

As used herein, the term "reagent" means an agent utilized to detect, characterize, monitor, measure, evaluate, and/or evoke other desired reactions to improve understanding of the disease, including tumorigenesis, progression, stasis, remission, recurrence, or resistance, and/or evaluate efficacy, mechanism of action, toxicity, biophysics, kinetics, and other aspects of therapeutic.

Cancer therapeutic candidates are developed in research laboratory environments and undergo thorough screening and evaluation before reaching animal modeling or clinical trials. Thus, a large number of cancer therapeutic candidates fail to reach evaluation stages beyond in vitro assays or modeling. Further, many cancer therapeutic candidates that show promise in a research laboratory environment do not deliver similar results in in vivo animal models. The present disclosure is directed to systems and methods of evaluating cancer therapeutic candidates using living tissue from post-mortem donors.

Donors in the present disclosure are deceased organ and/or tissue donors with cancer. See FIG. 1, step 110. Typically, such donors are considered unsuitable for tissue or organ donation, as metastasis concerns make organ donation incompatible. However, in the present disclosure, donor tissue is not used in other humans and is instead used in cancer models for improving disease understanding and assessing potential cancer therapeutics. Thus, the presence of cancer cells and tumors is not a risk factor as there is no human recipient. Donors are those who have provided legal consent for participation and donation. Compatible donors may have a variety of different characteristics, such as age, gender, disease progression, health conditions, previous treatments, geographical proximity to cancer centers, ethnic backgrounds, socioeconomic status, and other identifiable characteristics. Thus, a donor population for the present methods and systems has the potential for more diversity than typical eligible populations for clinical trials. For instance, a clinical trial participant would have socioeconomic resources to participate in the trial including proximity and transportation to trial site and may be required to have received available treatments or have reached a noncurative stage of disease for eligibility. In this case, eligible participants will generally draw from a homogenous socioeconomic pool and have late stage disease and/or poor treatment outcomes. The eligible population in this case is thus less likely to be representative of many cancer patients. It is possible that candidate therapeutics trialed with such a population may appear to hold less promise than would be shown against more diverse trial participants. Conversely, candidates that perform well for this select population may prove less effective against a more diverse patient pool. In the present disclosure, larger numbers of participants are possible, providing tissues that represent a more diverse population. Thus, different outcomes for candidate therapeutics are possible, such as a larger number of therapeutics being identified as effective.

Referring to FIG. 1, step 120, tissue or other samples are collected from the donor after a predetermined time period after recorded time of death, which may be after cardiac cessation or after time of death has been recorded by a qualified medical professional. In some instances, this predetermined time period is less than 12 hours, less than 8 hours, less than 4 hours, or any other time in which viable tissue samples may be provided. Samples are any biological sample obtained from a donor. The sample may be a whole blood, plasma, serum, erythrocytes, leukocytes (e.g., peripheral blood mononuclear cells), saliva, urine, feces, sputum, bronchial washing fluid, tears, lymph node disseminated tumor cells, micro needle aspirates, any other body fluids, tissue samples, biopsies of tumors (e.g., needle biopsies), and cell extracts of these. In some embodiments, the sample is a tissue sample with or without tumor. Non-tumor tissue may be utilized as a control. Tissue specimens may be collected using 18-gauge or higher spring loaded core needle biopsy systems or resected (approximately 20 mm×10 mm×2 mm) from the recently deceased organ/tissue donor. Non tumorous (control) tissue will be similarly obtained from same organ or tissue site. Any biopsy technique known in the art can be applied to the methods and compositions of the present disclosure. The biopsy technique applied will depend, among other factors, on the tissue type generally evaluated and on the size and type of tumor (i.e., solid or suspensive). Biopsy techniques compatible with the present disclosure include excisional biopsy, incisional biopsy, needle biopsy (e.g., core needle biopsy, fine-needle aspiration biopsy, etc.), surgical biopsy, and bone marrow biopsy. Resected tissue samples of varying sizes are compatible with the present disclosure, such that they may be maintained in a manner that ensures viability.

Optionally, as shown in FIG. 1, step 130, collected tissue is stored in media or other storage fluid to ensure viability. Basal components for storage media and supplements formulated for tissue and cell viability are known in the art and are commercially available.

In step 140, tissue samples are optionally placed in tissue transport kit for transport to a secondary location. The secondary location may be a storage location or a site of analysis, such as a laboratory. Tissue transport kits are prefilled with media specifically devised to collect and maintain live tissue. Tissue transport kit are maintained at approximately 4° C. Tissue transport containers in tissue transport kits are designed to allow adequate nutrient diffusion and gas exchange, protect intact live tissue, maintain tissue structural integrity, and minimize necrotic, apoptotic, or metabolic shocks to improve maintenance of viable tissue that faithfully retains characteristics of original patient tissue. Tissue transport kits may be shipped overnight or over 48 hours following specially designed cold chain logistics containers and protocols, as is known in the art.

In step 150 of FIG. 1, the tissue is prepared for analysis using one or more models, which are described in detail below. Preparation steps include cell culture, cell separations, media exchange, nucleic acid separation, nucleic acid amplification, sequencing, filtration, labeling, resizing, or other sample preparation steps for cell and tissue samples known in the art. In some embodiments, tissue samples are prepared for one cancer model system, while in other embodiments, tissue samples are prepared for several cancer model systems. In some instances, control tissue is prepared, with preparation steps substantially similar to those of tumor tissue.

Figure 2:
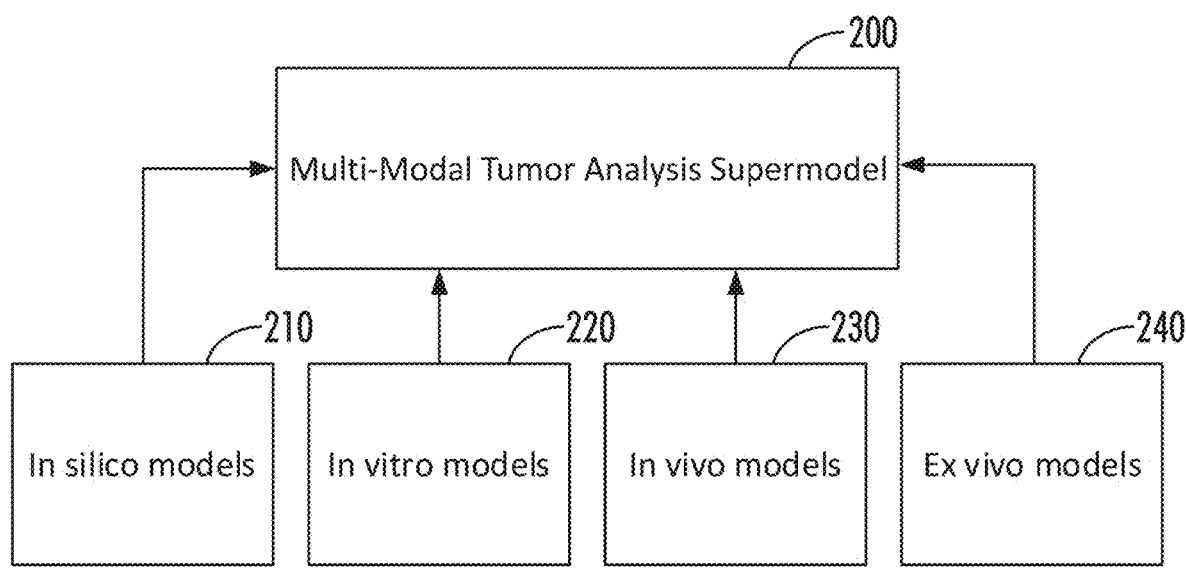
FIG. 2 is a flow chart providing a schematic view of a multimodal tumor analysis supermodel for the post-mortem tissue evaluation method of FIG. 1.

In step 160 of FIG. 1, samples are analyzed with at least one reagent or cancer therapeutic candidate using one or more model systems. Cancer therapeutic candidates are any candidate therapeutic at any stage of research that is available for analysis. Candidates, in some cases, are therapeutics that have not advanced in previous trials for further study. In other cases, candidates have not been evaluated prior to the present methods. In yet other cases, candidates have shown promising results in previous clinical trials or modeling. Cancer models are any model system that evaluates the effectiveness of a candidate therapeutics. FIG. 2 provides broad categories of cancer models.

Cancer models can be defined as systems recapitulating one or more aspects of the disease. Aspects ranging from the smallest biological features such as coding (genetics, epigenetics), cellular function and machinery (signaling cascades, biomechanical cues), and the tumor microenvironment, to abstract mathematical models, large population datasets, and even broader social and environmental influences on the disease. From a functional perspective, these models are utilized to further the understanding of basic tumor biology, predict tumor progression or regression, study drug responses and drug toxicity, and test drug delivery methods.

Cancer models can be classified in four general categories: in vitro, in vivo, ex vivo, and in silico model systems. In vitro models involve establishing or growing biological constructs in culture, such as in glass or plastic containers and dishes. These models provide biological construct growth or maintenance so that function, activity, or other temporal changes may be evaluated. In vivo and ex vivo models employ tissue established or grown in living organisms. One difference between in vivo and ex vivo is the location in which analysis is performed; inside a living organism in the former and outside in the latter. In silico models make reference to silicon computer chips and often refer to computational capacity used in life science applications. It has also been described as computation-based experimentation (Ekins, S. et al. In silico pharmacology for drug discovery: Methods for virtual ligand screening and profiling, *British Journal of Pharmacology*. (2007)). Thus, in silico models may include statistical models, numerical simulations, big data analytics, and emerging artificial intelligence (AI) engines.

In vitro models, depicted in FIG. 2, block 220, provide the ability to isolate and analyze very specific variables. Other key advantages include relatively low cost, quick turnaround, wide range of cancer subtypes, repeatability, and reproducibility. This is particularly true of simple two-dimensional (2D) monolayer models of cancer cells. Many cell lines are well-characterized and, in cases of rare cancer subtypes, often the only available model. Cell lines can also be easily stored, maintained, and shared. Besides being quick to establish, inexpensive, and reproducible, 2D cell line models are also very scalable, making them attractive for high-throughput screening of preclinical compounds. Three-dimensional (3D) spheroids and organoids integrate cancer cells with other cell types to better epitomize cell-cell interactions (Jakeman, P. G. et al. Improved in Vitro Human Tumor Models for Cancer Gene Therapy, *Human Gene Therapy*. (2015); Weiswald, L. B. et al. Spherical Cancer Models in Tumor Biology, *Neoplasia* (United States). (2015)) and mimic tumor microarchitecture. Microfluidic bioreactors and lab-chip systems capture biodynamic parameters to model a more comprehensive tumor microenvironment. Other in vitro model systems include, but are not limited to Transwell-based assays, avascular microfluidic devices, lab-chips, microphysiological systems (Budhwani, K. I. et al. (2015) Lab-on-a-brane: nanofibrous polymer membranes to recreate organ-capillary interfaces, *J Micromechanics Microengineering*. DOI: 10.1088/0960-1317/26/3/035013), and static 3D models, including cancer spheroids, organoids, and bioprinted co-cultures. Many in vitro systems are available commercially and known in the art to a person of ordinary skill in the art. Examples include the devices and methods of U.S. Pat. No. 10,114,010B1 and U.S. Pat. No. 10,969,383B1, the entire contents of which are incorporated herein.

In vivo models depicted in FIG. 2, block 230, offer different advantages, such as the ability to study an accelerated proxy of a disease and determine the impact of study variables on the disease within a living organism. Given the extensive library of immortalized cell lines, repeatable accelerated-avatars can be generated for desired molecular subtypes and targets to investigate pathology of human disease. Such cell-line derived xenografts (CDX) are used in studying pathophysiology and progression of disease, drug screening, biomarker discovery, probing targeted therapies, or any combination of thereof (Cheon, D.-J. and Orsulic, S. (2011) Mouse Models of Cancer. *Annu. Rev. Pathol. Mech. Dis.* DOI: 10.1146/annurev.pathol.3.121806.154244; Cook, N. et al. Predictive in vivo animal models and translation to clinical trials, *Drug Discovery Today*. (2012); Day, C. P. et al. Preclinical Mouse Cancer Models: A Maze of Opportunities and Challenges, *Cell*. (2015)). Patient derived xenografts (PDX) allow modelling of patient tumors in the presence of an immune system. Relative to in vitro models, xenografts better mimic tumor microenvironment and physiological and immune biodynamics which allows for considerable utility in assessing pharmacological activity including pharmacokinetics, pharmacodynamics, and toxicity. The path from preclinical studies to clinical trials for many new therapeutic agent incorporates xenografts for such analysis (Teicher, B. A. Tumor models for efficacy determination, *Molecular Cancer Therapeutics*. (2006); Rubio-Viqueira, B. et al. (2006) An in vivo platform for translational drug development in pancreatic cancer. *Clin. Cancer Res*. DOI: 10.1158/1078-0432.CCR-06-0113). In vivo model systems include, but are not limited to, CDX, PDX, mouse-derived isografts (MDI), and genetically engineered mouse models (GEMM). Many in vivo analysis methods are known in the art to a person of ordinary skill in the art.

In using in vitro and in vivo models to better understand cancer and develop preventive, diagnostic, and therapeutic strategies, a great volume of valuable data continues to be gathered. Computational methods have the capacity to analyze these large datasets and generally involve one or more of calculus, statistics, data warehousing and analytics, heuristics, neural networks, machine learning and AI capable of deep thought. Such in silico models use mathematical algorithms and computational capacity to describe and predict aspects of cancer initiation, progression, and drug response.

Data and algorithms are at the core of in silico models, a category depicted in FIG. 2, block 210. A natural advantage conferred upon this category of models, simply by the passage of time, is the availability of more data. This data spans a wide and versatile scope ranging from molecular pathways to physiological interaction to population datasets and the envirome. This in turn endows in silico models with the inherent ability to connect the dots from the nanoscale to a global scale. Such versatility to examine this broad array is not available to any other category of models. Additionally, with increasing computing capacity, costs associated with data storage and analysis sharply drive down barriers to entry for new investigators who can leverage abundant and elastic compute capacity coupled with ready access to large troves of public datasets. This has led to a rapid evolution of these models from ordinary differential equation into complex network models, constraint-based numerical simulations, and AI engines. Algorithms in in silico models span statistical analysis, stoichiometry and heuristics, artificial intelligence and machine learning, and numerical simulations and models, which results in a fast and continuously growing library of systems biology "parts" for plug and play analysis. Use of these in silico models, both in laboratory and clinical settings may be used to evaluate tumorigenesis and progression, tumor-immune system interactions, cancer biomarkers, and to predict therapeutic outcomes.

As cancers are massively multivariate dynamic systems, they are well suited for in silico models that leverage high computing capacity to integrate and analyze data from diverse sets of data. A "black box" transcriptional approach to in silico models focuses on providing answers such as which therapeutic options are optimal for a specific patient, or what factors could lead to disease progression or therapeutic resistance. This black box model could be further enhanced by combining it with ex vivo analysis of biopsy tissue from that patient. The utility of such bridging of ex vivo and in silico models could lead to evidence-based hypothesis generation for disease modeling and discovery of new therapeutics.

Another category of models, ex vivo models (depicted in FIG. 2, block 240), are those where tumor tissue is evaluated outside the patient body. Ex vivo models are valuable in personalized medicine applications seeking to predict which therapies would be most effective for each patient on an individualized basis. Ex vivo models include liquid biopsies, organoids, and microfluidics technology. Ex vivo techniques further include immunohistochemistry, flow cytometry, histology, and ELISpot. For example, microfluidic systems may be engineered to assess readout using small volumes of tumor specimens while still faithfully replicating the tumor microenvironment. Perfusion bioreactor systems containing tissue specimens form patient tumors are another approach to developing ex vivo cancer models. These models combine dissociated tumor tissue with extracellular matrix (ECM) in establishing a 3D system mimicking a solid tumor and its environment. The combination of tumor cells and ECM components is established in the bioreactor to enable perfusion of media containing nutrients for tumor cell growth. This model has been used to evaluate therapeutic efficacy by adding therapeutic compounds to perfused media and subsequently analyzing changes to tumor cell proliferation and apoptosis. Another example of an ex vivo system compatible with the present disclosure is the SMART biomimetic array device of U.S. Pat. No. 11,097,274B2, the entire contents of which are incorporated herein.

In some embodiments, any and all methods and models may be expanded for high-throughput analysis of therapeutic candidates. For instance, different candidate therapeutics may be analyzed for effectiveness in treating tumor tissue samples in a microfluidic device by employing different microfluidic channels to test different therapeutics. The ability to evaluate multiple therapeutics using one sample provides a time and sample-efficient means of identifying promising candidates.

In some embodiments, one or more models are utilized together in a multi-model disease analysis supermodel as depicted in FIG. 2, block 200. In such a supermodel, in vivo, in vitro, ex vivo, and in silico models are used to develop a multi-dimensional tumor supermodel. Individual modeling may be performed sequentially, simultaneously, or in a combination thereof. For instance, a tissue sample may be sequenced and analyzed through in silico modeling, while it is also expanded in culture for in vitro analysis. Samples from the same tissue may be evaluated using ex vivo and in vivo models simultaneously. Analyses from this multimodal investigation will be connected to form a supermodel of the tumor which will be used for (1) further elucidating disease mechanisms, (2) evaluating efficacy of formulations in preclinical pipelines, (3) evaluating counterfactual efficacy of promising formulations that previously failed preclinical or clinical trials, (4) counterfactual personalized efficacy assessment of FDA approved therapy for cancer diagnosis, (5) counterfactual triage and enrollment in umbrella or independent clinical trials, (5) other therapeutic evaluation and patient-proxy avatar analysis, (6) any combination of these.

Figure 3:
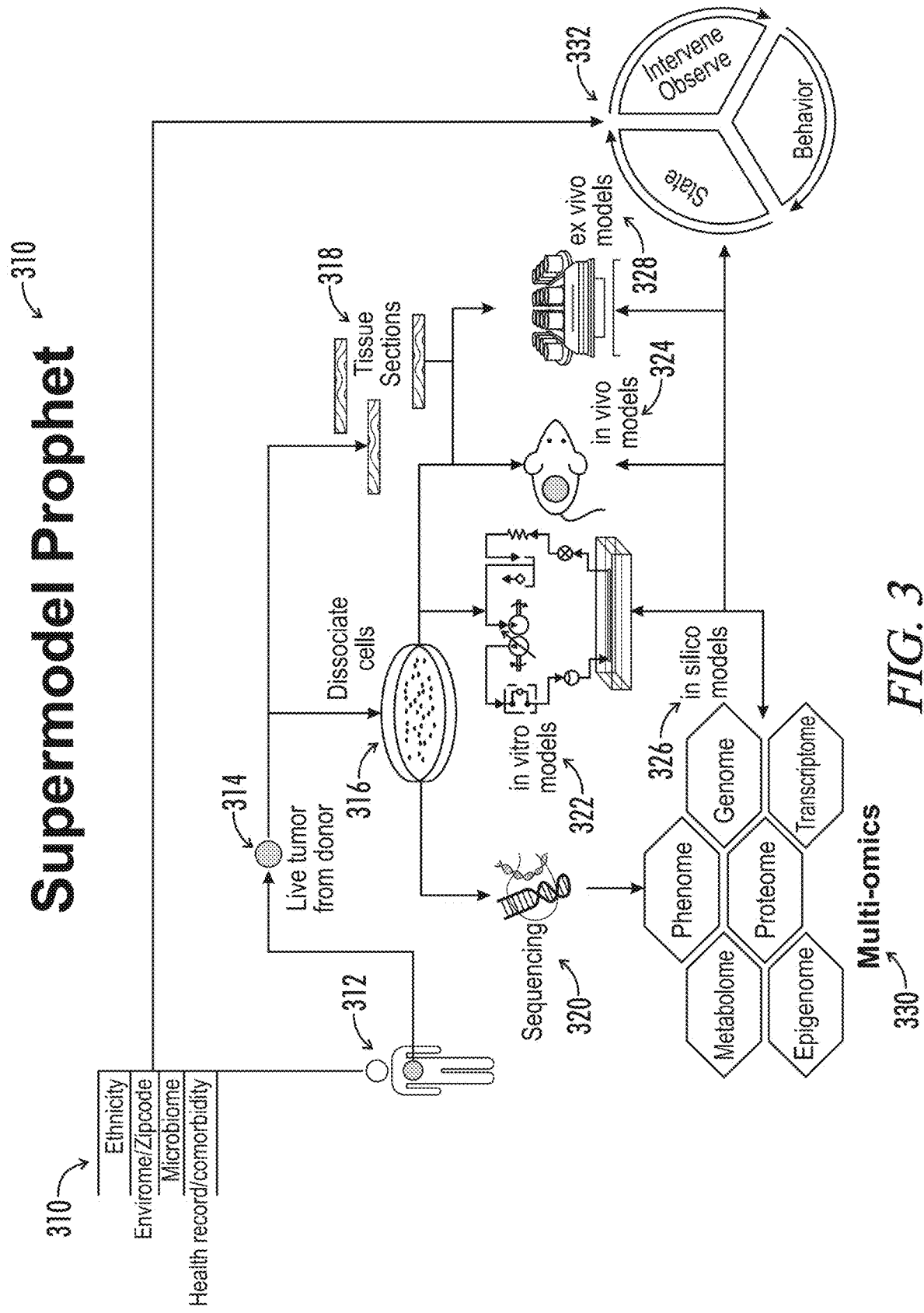
FIG. 3 is a schematic and flow chart depicting multimodal analysis of tumor tissue provided by the post-mortem tissue evaluation method of FIG. 1.

FIG. 3 is a schematic and flowchart describing the multi-model disease analysis supermodel Prophet 300 used in conjunction with post-mortem tissue or patient tissue. For post-mortem tissue, an eligible donor 312 is identified and registered. For patient tissue, an eligible patient is identified as the tissue donor 312. Such a patient is eligible based on disease diagnosis, disease potential, treatment regimen, disease progression/stage, or other factors. In some instances, a patient donor could have been seeking a personalized treatment or disease analysis. The donor's collected registration includes intake of information 310 associated with donor 312, including ethnic origin, a geographic profile and/or envirome of the donor's residential history, and one or more demographic and clinical parameter of the eligible donor. The demographics and clinical parameters include donor age, weight, comorbidities, and functional status, and are recorded at diagnosis and through course of treatment of donor 312. Donor information 310 may be obtained from documents with prior donor consent, such documents including the donor's medical health record.

At least one tissue sample 314 is obtained from donor 312 after a predetermined time period after donor death, as described above in detail. Tissue sample 314 is in some cases a tumor sample, which includes solid tumor tissue samples and liquid samples. One or more tissue sample 314 is collected from donor 312 through tumor biopsy or resection and is transported and stored as described above. Dissociated cells 316 from tissue sample 314 are prepared as known in the art, and are compatible with downstream nucleic acid sequencing techniques 320, in vitro models 322, and in vivo models 324, as described below in detail. Tissue sections 318 from tissue sample 314 are prepared as known in the art, and are compatible with downstream in vitro models 322, in vivo models 324 and ex vivo models 328, as described below.

For example, tissue samples 314 collected from tumor biopsy are divided into sections. Dissociated cells 316 from one section are expanded using in vitro models 322 for a priori high-throughput screening against large libraries of therapeutic candidates. Another section is sequenced using nucleic acid sequencing techniques 320 to establish a multi-omics profile 330 of the tumor for in silico models 326 using artificial intelligence/machine learning (AI/ML) engines trained on networks of federated repositories of hundreds of thousands of electronic health records and imaging. Treatment strategies deemed promising based on readouts from these in vitro and in silico components of supermodel 300 are used to design N-of-1 trials with ex vivo models 328. Such ex vivo models 328 evaluate efficacy of candidate therapeutics against remaining biopsy tissue. Ex vivo models 328 involve analysis of efficacy, dose, and combination therapy.

Readouts from the above modeling assist in optimally identifying therapeutic lead and backup candidates, associated dosing, trial design, treatment strategy, disease mechanisms and therapeutic response characteristics, progression profile, prognosis biomarkers, diagnosis and diagnostics parameters, metastatic potential, recurrence, refractory, and various other observable and measurable characteristics of the complete or counterfactual cancer cycle (CCCC) 332. CCCC 332 and optimal arcs for novel therapeutics (discovery, screening, trials) and care delivery (diagnosis, prognosis, treatment, surveillance) is based on supermodel analysis of one or more donors 312, and includes both modeling readouts and donor information 310. Due to the larger diversity of donors 312 available using post-mortem tissue, a broader and more efficient analysis of therapeutic candidates is possible. CCCC 332 arcs can be dialed forward with in vivo avatars of donor tumors developed post facto (using dissociated cells 316 grown in culture previously using in vitro models 322). In in vivo models 324, these avatars are treated with proposed treatment regimens of candidate therapeutics. Avatars simulate, for example, disease progression, stable disease, recurrence, refractory disease, and what-if analysis pertaining to specific disease conditions or treatment scenarios. The in vivo models 324 further offer an accelerated longitudinal timelapse of treatment effectiveness, disease progression, and metastatic potential.

De-identified data and donor information 310 from each such supermodel analysis not only improves future in silico AI/ML capabilities but also provides a robust library of targets for biopharma research and discovery. Data de-identification is undertaken using methods known in the art. Broader adoption and integration of such a supermodel 300 improves representation from more diverse socioeconomic segments in datasets for in silico models 326 and deep learning systems training.

Therapeutic candidates are, in some cases, further evaluated to identify potential therapeutic lead and backup candidates. The identification is aided, at least in part, by analysis results of supermodel 300. Therapeutic lead and backup candidates are determined for evaluating counterfactual efficacy of promising formulations that previously failed preclinical or clinical trials, counterfactual personalized efficacy assessment of FDA approved therapy for cancer diagnosis, counterfactual triage and enrollment in umbrella or independent clinical trials, or simulating outcomes with in vivo avatars of donor tumors developed post facto. In some cases, one or more associated information is determined for the therapeutic lead and backup candidates: dosing, trial design, treatment strategy, disease mechanisms and therapeutic response characteristics, progression profile, prognosis biomarkers, diagnosis and diagnostics parameters, metastatic potential, recurrence, refractory, and various other observable and measurable characteristics of the complete or counterfactual cancer cycle.

Another application of supermodel 300 is for use in personalized medicine applications. In such applications, donors 312 include patients seeking diagnosis, cancer treatment, or analysis of disease progression and/or treatment effectiveness. Tissue samples 314 are collected to provide liquid or solid tumor samples as known in the art, and through such methods dissociated cells 316 and/or tissue sections 318 are provided. Patient health and comfort are emphasized in tissue collection procedures. Treatment strategies or therapeutics are deemed promising based on data provided by in vitro models 322 and in silico models 326, as described above for post-mortem tissue. The data is used to design N-of-1 trials with ex vivo models 328, as described above. Readouts from the ex vivo models 328 facilitate informed shared decision making and assist clinical teams in developing optimal treatment strategy 332 on a personalized basis for the patient. Once treatment strategy 332 is developed and treatment is administered to patient, in vivo models 324 are utilized, similar to that described above for post-mortem tissue analysis. However, avatars are treated with regimens mimicking those administered to the patient and are used to provide potential early warning harbingers of recurrence, progression, and metastatic potential specifically for the patient under the regimen tested. Specimens from harbinger xenografts give clinical teams a head start in developing treatment strategies well before such disease progression is diagnosed in the patient.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

I claim:

1. A method of screening a cancer therapeutic candidate using live tissue from a post-mortem cancer patient donor, the method comprising:
   identifying an eligible cancer patient donor;
   registering the eligible cancer patient donor;
   collecting a live tissue sample within a predetermined time period after recorded time of death of the eligible cancer patient donor, wherein the live tissue sample includes a tumor tissue and an intact extracellular matrix (ECM);
   storing the live tissue sample after collection such that the live tissue sample remains viable;
   preparing the live tissue sample for analysis;
   analyzing the ECM and a cell fraction from the live tissue sample for 3D tumor microarchitecture and microenvironment characterization for correlation and engineering tissue proxies; and
   analyzing effectiveness of the cancer therapeutic candidate by exposing the live tissue sample to the cancer therapeutic candidate.

2. The method of claim 1, wherein the predetermined time period is twelve hours after death of the eligible cancer patient donor.

3. The method of claim 1, wherein the eligible cancer patient donor has consented to tissue donation while alive.

4. The method of claim 1, wherein the eligible cancer patient donor is a patient who is under treatment for, suspected of having, or diagnosed with cancer.

5. The method of claim 4, wherein the cancer is a subject of treatment with the at least one cancer therapeutic candidate.

6. The method of claim 1, wherein the eligible cancer patient donor is a patient who has been or was under treatment for cancer for months leading up to recorded time of death.

7. The method of claim 1, comprising transporting the live tissue sample to a secondary location after storage, such that the live tissue sample remains viable throughout transport.

8. The method of claim 7, wherein the live tissue sample remains at approximately 4° C. throughout transport.

9. The method of claim 1, wherein the live tissue sample is collected using an 18-gauge or higher spring-loaded core needle biopsy system.

10. The method of claim 1, wherein the collection is a resection of the at least one live tissue sample.

11. The method of claim 10, wherein the live tissue sample is approximately 20 mm×10 mm×2 mm.

12. The method of claim 1, wherein the live tissue sample is a solid tissue sample, and the solid tissue sample is analyzed in conjunction with at least one a liquid tissue sample.

13. The method of claim 1, wherein the live tissue sample is a solid tissue sample, and the solid tissue sample is analyzed in conjunction with at least one other solid tissue sample.

14. The method of claim 1, wherein a liquid tissue sample is analyzed in conjunction with another liquid tissue sample.

15. The method of claim 1, wherein the live tissue sample is analyzed in conjunction with at least one non-tumor tissue sample.

16. The method of claim 1, wherein the live tissue sample is analyzed in conjunction with an ethnic origin of the eligible cancer patient donor.

17. The method of claim 1, wherein the live tissue sample is analyzed in conjunction with a geographic profile of a residential history of the eligible cancer patient donor.

18. The method of claim 1, wherein the live tissue sample is analyzed in conjunction with an envirome of a residential history of the eligible cancer patient donor.

19. The method of claim 1, wherein the live tissue sample is analyzed in conjunction with demographics and clinical parameters of the eligible cancer patient donor, wherein demographics and clinical parameters include at least one of donor age, weight, comorbidities, and functional status, the demographics and clinical parameters recorded at diagnosis and through course of treatment of the eligible cancer patient donor.

20. The method of claim 1, comprising: identifying the cancer therapeutic candidate as a lead compound when the cancer therapeutic candidate exerts a therapeutic effect on the live tissue sample; and administering an effective amount of the cancer therapeutic candidate to a subject with cancer.

21. A method of clinical testing of a lead compound cancer therapeutic, the method comprising: administering an effective amount of the lead compound to a subject with a cancer; and measuring the response of the cancer to the lead compound; wherein the lead compound was screened according to the method of claim 1.

22. A method of modeling effectiveness of cancer therapeutics using live tissue from post-mortem cancer patient donors, the method comprising:
   identifying a cancer patient population comprising a plurality of living donors;
   registering each eligible cancer patient donor and donor information specific to each eligible cancer patient donor while each eligible cancer patient donor is alive;
   collecting a live tissue sample within a predetermined time period after death of each eligible cancer patient donor;
   storing each live tissue sample after collection such that each live tissue sample remains viable; and
   analyzing effectiveness of a cancer therapeutic candidate using each live tissue sample with an in vitro model, an in silica model, an in vivo model, an ex vivo model, or a combination of two or more thereof.

23. The method of claim 22, wherein the donor information includes at least one of donor age, weight, comorbidities, and functional status, and residential history.

24. The method of claim 22, wherein each tumor tissue sample is analyzed in conjunction with the donor information.

25. The method of claim 22, further comprising de-identifying data produced from analysis of each live tissue sample to generate de-identified data.

26. The method of claim 25, wherein the de-identified data is entered into a library for future biopharma research and discovery.

27. The method of claim 25, wherein the de-identified data is provided to a repository to improve future in silica modeling.

28. The method of claim 22, further including identifying therapeutic lead and backup candidates from results of effectiveness analysis of at least one cancer therapeutic candidate.

29. The method of claim 28, further including the step of determining, for identified therapeutic lead and backup candidates, at least one of: associated dosing, trial design, treatment strategy, disease mechanisms and therapeutic response characteristics, progression profile, prognosis biomarkers, diagnosis and diagnostics parameters, metastatic potential, recurrence, and refractory.

30. The method of claim 28, wherein the therapeutic lead and backup candidates are identified for evaluating counterfactual efficacy of promising formulations that previously failed preclinical or clinical trials.

31. The method of claim 28, wherein the therapeutic lead and backup candidates are identified for counterfactual personalized efficacy assessment of FDA approved therapy for cancer diagnosis.

32. The method of claim 28, wherein the therapeutic lead and backup candidates are identified for counterfactual triage and enrollment in umbrella or independent clinical trials.

33. The method of claim 28, wherein the therapeutic lead and backup candidates are identified for simulating outcomes with in vivo avatars of donor tumors developed post facto.

34. The method of claim 22, wherein the step of analyzing the effectiveness of the cancer therapeutic candidate comprises exposing each live tissue sample to the cancer therapeutic candidate, and wherein the method comprises: identifying the cancer therapeutic candidate as a lead compound when the cancer therapeutic candidate exerts a therapeutic effect on the live tissue sample; and administering an effective amount of the cancer therapeutic candidate to a subject with cancer.

35. A method of clinical testing of a lead compound cancer therapeutic, the method comprising: administering an effective amount of the lead compound to a subject with a cancer; and measuring the response of the cancer to the lead compound; wherein the lead compound was screened according to the method of claim 22.

* * * * *